(12) United States Patent
Zou et al.

(10) Patent No.: US 8,332,840 B2
(45) Date of Patent: Dec. 11, 2012

(54) METHOD OF COMPUTER BASED DATA CARD SOFTWARE DOWNLOADING AND UPDATING

(75) Inventors: Qiuzhen Zou, Shanghai (CN); Chunlai Yi, Shanghai (CN); Fengchun Xu, Shanghai (CN)

(73) Assignee: Shanghai Mobilepeak Semiconductor Co., Ltd., Shanghai (CN)

( * ) Notice: Subject to any disclaimer, the term of this patent is extended or adjusted under 35 U.S.C. 154(b) by 1081 days.

(21) Appl. No.: 12/238,923

(22) Filed: Sep. 26, 2008

(65) Prior Publication Data

US 2009/0119659 A1    May 7, 2009

(30) Foreign Application Priority Data

Nov. 6, 2007    (CN) .......................... 2007 1 0047834

(51) Int. Cl.
*G06F 9/44*    (2006.01)
(52) U.S. Cl. ...................................... 717/173
(58) Field of Classification Search .................. 717/173
See application file for complete search history.

(56) References Cited

U.S. PATENT DOCUMENTS

| | | | | |
|---|---|---|---|---|
| 5,805,791 A | * | 9/1998 | Grossman et al. | 714/23 |
| 6,005,841 A | * | 12/1999 | Kicklighter | 370/217 |
| 6,513,075 B1 | * | 1/2003 | Perkel et al. | 710/8 |
| 6,839,779 B2 | * | 1/2005 | Simpson et al. | 710/60 |
| 7,194,502 B1 | * | 3/2007 | Gavlik et al. | 709/200 |
| 2003/0061314 A1 | * | 3/2003 | Wang | 709/220 |
| 2003/0121032 A1 | * | 6/2003 | Cho et al. | 717/173 |

\* cited by examiner

*Primary Examiner* — Wei Zhen
*Assistant Examiner* — Lanny Ung
(74) *Attorney, Agent, or Firm* — Banner & Witcoff, Ltd.

(57) ABSTRACT

The present invention relates to a method of computer based data card software downloading and updating, in which, the data card connects with computer via data communication interface and acts the power on initial process at same time, the data card downloads software kit from computer to RAM memory, and the data card operates the software kit downloaded to the RAM memory. With this method of computer based data card software downloading and updating, no any more expensive Flash memory to be used in the data card, a lower cost is thus resulted, the data card failure resulted from Flash memory damage could be avoided and hence the data card reliability is increased; In course of data card downloading the update program and software from computer, it just needs re-update again only even though in fault, the complete operation is convenient and rapid with a wide suitable field, this lays the foundation of the advancing and development for the data communication peripheral equipment technology of portable equipment.

9 Claims, 3 Drawing Sheets

METHOD OF COMPUTER BASED DATA CARD SOFTWARE DOWNLOADING AND UPDATING

CROSS-REFERENCE TO RELATED APPLICATIONS

The present application claims the benefit of priority to Chinese Application No. 200710047834.8, filed Nov. 6, 2007 in China, the content is incorporated by reference herein.

TECHNOLOGY FIELD

The present invention relates to a data card field, and more particularly, to a data card software downloading field, concretely relates to a method of computer based data card software downloading and updating.

BACKGROUND TECHNOLOGY

In modern lives, various corresponding communication mode is developed along the population of various portable equipment and communication technology advancement, wherein the people would use every kinds of data cards in the normal operation of the portable equipment daily usage with its different functions. A key point within these data card is the communication protocol stack and data card application program software that operated within it, especially for the current populated wireless data communication, it combines ingeniously the highly flexibility of the portable equipment with the freely environment condition of the wireless data communication, and become a major network data communication mode of the present portable equipment with the wireless data card as the basis.

The traditional wireless data card as FIG. 1 shows, this wireless data card includes CPU, RAM memory, Flash memory and wireless transceiver+MODEM, in which, said CPU is connected respectively with said RAM memory, Flash memory and wireless transceiver+MODEM, the driver in the computer end recognizes the data card and data & instruction interaction between computer and data card, the protocol stack program and application software needed for the card processor, however, have no relation with computer, and all are stored in the Flash memory of card, in time of wireless data card powering on, the bootstrap program would transmit the program and software in Flash memory into RAM memory automatically for operation of the card processor.

Obviously, the said mode of wireless data card must have a non-volatile Flash memory as the program storage medium to ensure the storage of protocol stack program and application software in time of card power off, and the cost is higher; moreover, once the Flash memory of data card has failure, the data card could not operate any more; in other side, when the data card updates the program software, it need erase the volume Flash memory of data card, this course is slow, the operator need have a certain hardware experience, operator must have a higher operation experience, a fault may resulted in Flash memory damage, and even seriously, a problem occurred in the erasing course of Flash memory would resulted in the damage of whole wireless data card and bring up a no convenience in the work and lives.

DISCLOSURE OF THE INVENTION

It is therefore an object of the present invention to provide a method which is free from said disadvantages, i.e. a method of computer based data card software downloading and updating, which downloads the software kit into the data card through computer directly with a simple operation, reliable property, lower cost and wide field.

For said object, the method of computer based data card software downloading and updating according to present invention is as follows:

A method of computer based data card software downloading and updating, in which said data card includes the CPU and RAM memory connected with it, characterized in that said method includes the following steps:

(1) data card connects with computer via data communication interface and acts the power on initial process at same time;

(2) the data card downloads software kit from computer to RAM memory;

(3) the data card operates the software kit downloaded to the RAM memory.

The power on initial process according to the method of computer based data card software downloading and updating includes following steps:

(11) the data card acts itself the power on hard reset;

(12) the CPU of data card operates the startup program of data card;

(13) the data card sets the default request times for download to O.

According to the method of computer based data card software downloading and updating, startup program of data card is stored in the internal ROM memory unit of the data card CPU, and is started from its start address.

According to the method of computer based data card software downloading and updating, the computer includes the driver with software kit, said data card downloads the software kit from computer, and the operation is:

The data card startup program of data card and the data card driver installed in the computer co-act to download the software kit from computer to data card.

According to the method of computer based data card software downloading and updating, the data card startup program of data card and the data card driver installed in the computer co-act to download the software kit from computer to data card, it includes following steps:

(21) the data card connects with computer via data communication interface and initialize said data communication interface;

(22) the data card driver of computer recognizes if the data card is a valid device, and sets the flag of "software sent" in the data card driver to the "not sent" default value;

(23) the data card startup program of data card initializes the RAM memory, and sends the "download software kit" request information periodically to the computer data card driver via said data communication interface and by the default download request interval;

(24) the computer data card driver operates the corresponding request for downloading software kit;

(25) the computer data card driver and the data card startup program of data card operate the software kit downloading via the data communication interface;

(26) after downloading, the data card increases the default request times for downloading by 1 and turns to the following step (3).

According to the method of computer based data card software downloading and updating, the request for downloading software kit includes the following steps:

(241) judge if the data card identified by the computer data card driver and connected with said data communication interface is a valid device of corresponding port, and judge if the flag of "software sent" of data card driver is "not sent";

(242) if yes, the computer data card driver will continue to receive the software kit download request information of the data card;

(243) if received, the computer data card driver would sends to the data card of instruction of "stop transmitting request for downloading" and indication of "ready to send software kit";

(244) after the data card startup program of data card receives the instruction, it would stop transmitting the software kit download request information, and ready to receive the corresponding software kit.

According to the method of computer based data card software downloading and updating, the computer data card driver and the data card startup program of data card operate the software kit downloading via the data communication interface, it includes the following steps:

(251) the computer data card driver operates the write to data card via the data communication interface, downloads the corresponding software kit to RAM memory of the data card, and sets the flag of "software sent" to the "transmitting";

(252) after downloading, the computer data card driver would sends to the data card of the download complete instruction, and sets the flag of "software sent" to "not sent";

(253) after the startup program of data card in the data card receives the download complete instruction, it continues to execute the following step (26).

According to the method of computer based data card software downloading and updating, the data card operates the software kit download to the RAM memory, it includes following steps:

(31) the CPU of data card skips the running address of code to the start address of code stack in RAM memory and operates;

(32) judge if the data card operates correctly the software kit;

(33) if correct, prompts the information that data card downloading the correct software kit;

(34) if not correct, judge if the default request times for download in the data card exceeds the default maximum request times for download;

(35) if yes, prompts the information that data card downloading the wrong software kit;

(36) if no, the data card startup program of data card sends the "download software kit" request information periodically to the computer data card driver via said data communication interface and by the default download request interval again and return back to step (24).

According to the method of computer based data card software downloading and updating, the data communication interface includes PCMCIA interface, PCI interface, mini PCI interface, PCI Express interface, mini PCI Express interface, IEEE 1394 interface, USB interface, Parallel Port, Serial Port, Bluetooth Interface or IrDA: Infrared Data Interface.

According to the method of computer based data card software downloading and updating, the data card is wireless data card, the wireless data card includes the wireless communication module, and said wireless communication module connects with said CPU.

According to the method of computer based data card software downloading and updating, the wireless communication module includes wireless transceiver and MODEM, said CPU connects said wireless transceiver with MODEM.

According to the method of computer based data card software downloading and updating, the software kit includes the data card startup program, L1 driver, communication protocol stack and application program.

With this method of computer based data card software downloading and updating according to present invention, in virtue of the driver function in end of computer, no any more Flash memory is needed in the data card, but store the protocol stack program and application software needed for the data card into the driver data kit of computer, in time of the data card is connected with computer and started, computer download the protocol stack program and application software needed for data card to data card RAM memory via high speed data interface, so no any more expensive Flash memory to be used in the data card, a lower cost is thus resulted, and owing to the fact that no software data is stored in the data card, the data card failure resulted from Flash memory damage could be avoided and hence the data card reliability is increased; due to the fact that both the program and software needed for the data card operation is stored in the computer driver kit, in time of updating the data card program and software, only the computer driver kit needed to be revised, and in course of data card downloading the update program and software from computer, it just needs re-update again only even though in fault, the complete operation is convenient and rapid with a wide suitable field, this lays the foundation of the advancing and development for the data communication peripheral equipment technology of portable equipment.

PREFERRED EMBODIMENTS OF THE INVENTION

To explain the present invention in greater detail, the preferred embodiments will be described below with reference to the accompanying examples.

Figure 1:
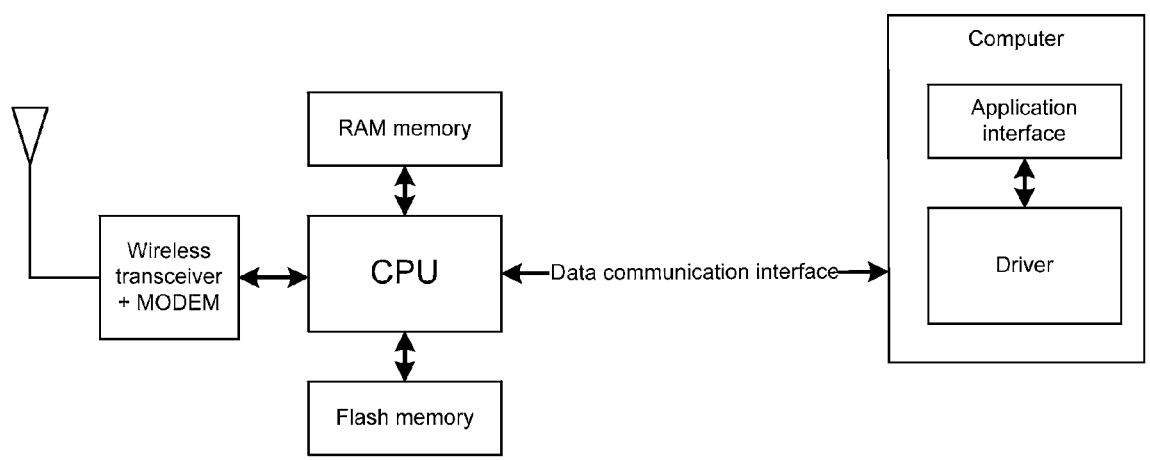
FIG. 1 is a function diagram showing the software downloading and updating by wireless data card according to the current technology.
Figure 2:
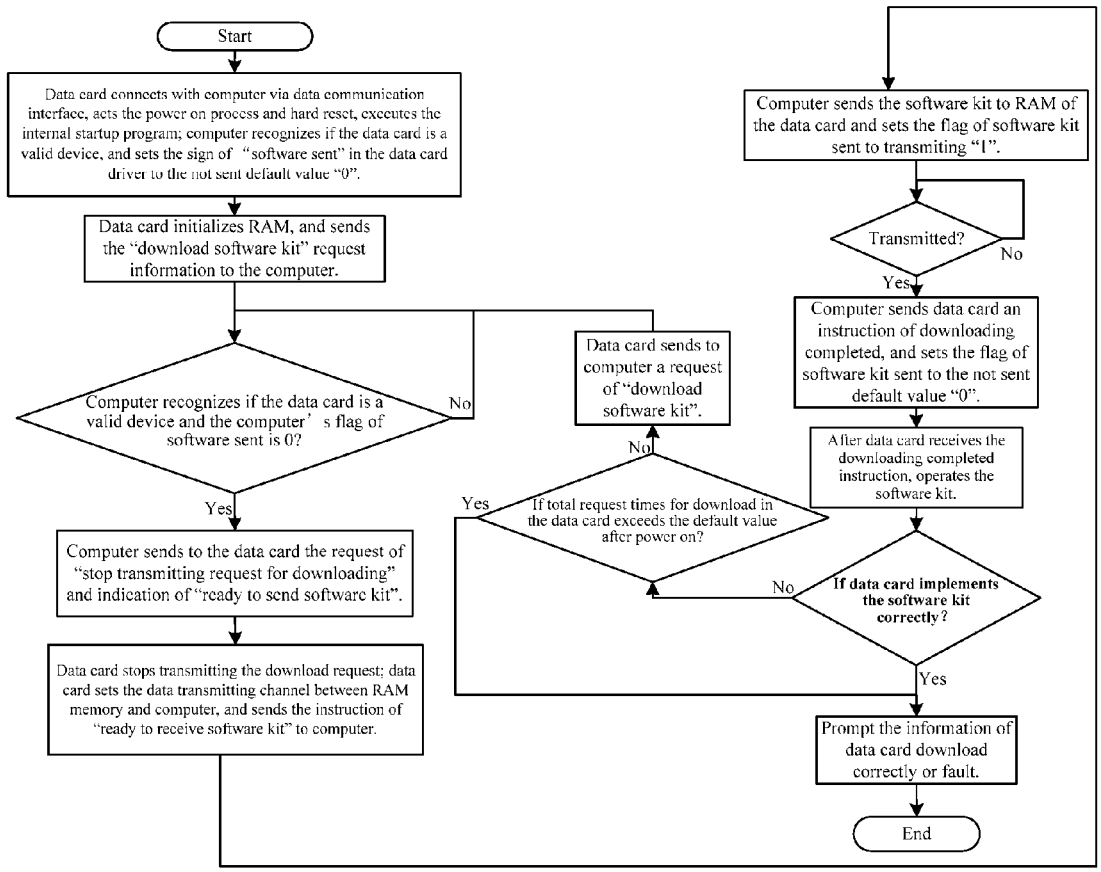
FIG. 2 is a flow diagram showing the method of computer based data card software downloading and updating according to the present invention.
Figure 3:
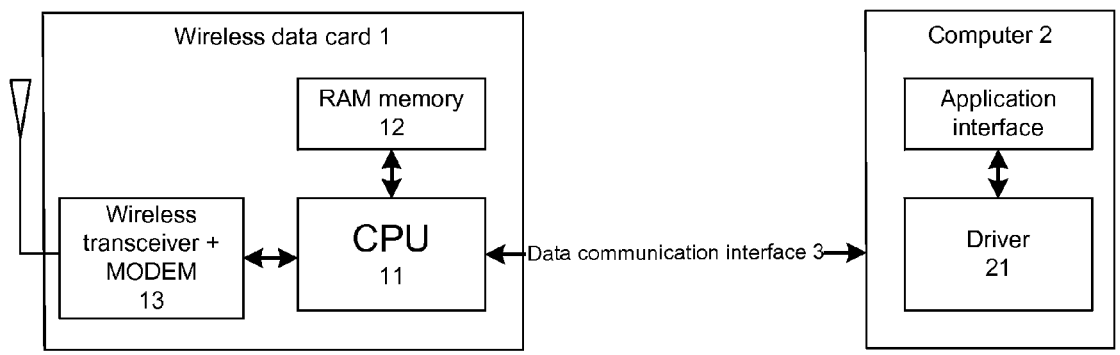
FIG. 3 is a function diagram showing the software downloading and updating by wireless data card according to the present invention.

Refer to FIG. 2 and FIG. 3, the data card according to the embodiment is wireless data card 1, including CPU 11 and RAM memory 12 connected with it and wireless communication module, said wireless communication module includes wireless transceiver+MODEM 13, said CPU 11 connects said wireless transceiver with MODEM; driver 21 at end of computer 2 includes software program kit, said software kit includes the data card startup program for the operation of wireless data card 1, L1 driver, communication protocol stack and application program.

The data card may surely be the other data communication external interface data card that could establish a data communication connection to computer 2 with its method similarly to that of the wireless data card 1.

In an embodiment according to present invention, the method of computer 2 based data card 1 software downloading and updating includes the following steps:

(1) data card 1 connects with computer 2 via data communication interface and acts the power on initial process at same time; said power on initial process includes following steps:

(1a) the data card 1 acts itself the power on hard reset;

(1b) the CPU 11 of data card 1 operates the startup program of data card 1; said startup program of data card 1 is stored in the internal ROM memory unit of the data card 1 CPU 11, and is started from its start address, it may be stored in other place of wireless data card 1 according to condition;

(1c) the data card 1 sets the default request times for download to O;

(2) the data card 1 downloads software kit from computer 2 to RAM memory 12, in the operation, data card startup program of data card 1 and the data card driver 21 installed in the computer 2 co-acts to download the software kit from computer to data card, it includes following steps:

(2a) the data card 1 connects with computer 2 via data communication interface and initialize said data communication interface;

(2b) the data card driver 21 of computer 2 recognizes if the data card 1 is a valid device, and sets the flag of "software sent" in the data card driver 21 to the "not sent" default value;

(2c) the data card startup program of data card 1 initializes the RAM memory 12, and sends the "download software kit" request information periodically to the computer 2 via said data communication interface; in which, the download request cycle may be set to 1 to 3 system clock cycle according to the system operation, in present invention, the download request cycle is better set to 1 system clock cycle to ensure the sensitive system responsibility, the real time feature and operation efficiency.

(2d) default data card driver 21 in computer 2 recognizes the wireless data card 1 and corresponding request for downloading software kit, including following steps:

(i) judge if the data card 1 identified by the computer 2 data card driver 21 and connected with said data communication interface is a valid device of corresponding port, and judge if the flag of "software sent" of data card driver 21 is "not sent";

(ii) if yes, the computer 2 data card driver 21 will continue to receive the software kit download request information of the data card 1;

(iii) if received, the computer 2 data card driver 21 would sends to the data card 1 of instruction of "stop transmitting request for downloading" and indication of "ready to send software kit";

(iv) after the data card 1 startup program of data card 1 receives the instruction, it would stop transmitting the software kit download request information, and ready to receive the corresponding software kit.

(2e) the computer 2 data card driver 21 and the data card 1 startup program of data card 1 operate the software kit downloading via the data communication interface, it includes the following steps:

(i) the computer 2 data card driver 21 operates the write to data card 1 via the data communication interface, downloads the corresponding software kit to RAM memory 12 of the data card 1, and sets the flag of "software sent" to the "transmitting" in transmitting;

(ii) after downloading, the computer 2 data card driver 21 would sends to the data card 1 of the download complete instruction, and sets the flag of "software sent" to "not sent";

(iii) after the startup program of data card 1 in the data card 1 receives the download complete instruction, it continues to execute the following step (2f).

(2f) after downloading, the data card 1 increase the default request times for downloading by 1 and turns to the following step (3)

(3) data card 1 operates the software kit download to the RAM memory 12, it includes following steps:

(3a) The CPU 11 of data card 1 skips the running address of code to the start address of code stack in RAM memory 12 and operates;

(3b) judge if the data card 1 operates correctly the software kit;

(3c) if correct, prompts the information that data card downloading the correct software kit;

(3d) if not correct, judge if the default request times for download in the data card 1 exceeds the default maximum request times for download;

(3e) if yes, prompts the information that data card downloading the wrong software kit;

(3f) if no, the data card 1 startup program of data card 1 sends the "download software kit" request information periodically to the computer 2 data card driver via said data communication interface and by the default download request interval again and return back to step (2d).

Further more, said method is suitable for various computer 2 data communication interface, said data communication interface includes but without limited the PCMCIA interface, PCI interface, mini PCI interface, PCI Express interface, mini PCI Express interface, IEEE 1394 interface, USB interface, Parallel Port, Serial Port, Bluetooth Interface, Infrared Interface and other suitable data communication interface; said PCI interface may be a PCI-Express interface, said mini PCI interface may be a mini PCI-Express interface.

The operation according to present invention needs the following steps:

【step 1.1】—wireless data card 1 is connected to the computer 2 via various data communication interface, acts the power on initial process at same time, and sets the default request times for download to O.

【step 1.2】—wireless data card 1 request re-downloading software kit, this operation is controlled by the special wireless startup program of data card before wireless data card 1 does not operate the downloading program. After the wireless data card 1 operate normally the downloading program, computer 2 may issue an instruction to order wireless data card 1 re-download software kit in accordance with the program kit operation at any time.

【step 2】—following up the step 1.1 or 1.2 above, the data card 1 would send the request signal of downloading program and software periodically, said startup program of data card may be stored in the internal ROM memory unit of the processor, and is started from the processor default start address after power on or reset, this program must has little program skip instructions and little processor GPIO (Generic Purpose Input Output) control instructions at least.

【step 3】—the computer 2 recognizes correctly the wireless data card 1 is a valid device of the corresponding port and sets the flag of "software sent" in the wireless data card driver to the "not sent" default value, this course is executed by driver kit 21 at the end of computer 2.

These【step 3】and【step 2】are executed independently and have no exactly logical relations.

【step 4】—following up the【step 2】and【step 3】, if the computer 2 recognizes correctly that the data card 1 is a valid device of the corresponding port and the flag of "software sent" of data card driver is "not sent", after computer 2 receives the wireless data card 1 downloading request, it would sends to the data card 1 an instruction of "stop transmitting request for downloading", operates the write to data card 1, and downloads the insetting program and software kit to RAM memory 12 of the data card 1 via various data communication interface including PCMCIA, USB interface, in this course, sets the flag of "software sent" to the "transmitting". If successfully downloading, the computer data card driver would sends to the data card 1 a download complete instruction, and sets the flag of "software sent" to "not sent". This operation is executed by the driver at end of computer 2 and startup program of data card 1.

【step 5】—following up 【step 4】, if receives a download complete instruction, the data card 1 would increases the default request times for downloading by 1 and operates the downloaded software kit, i.e. skips the program running address to the start address of code stack in RAM memory.

If operation successfully, the wireless data card would operate continuously, otherwise in failure, wireless data card would judge if the default request times for download exceeds the system default maximum request times for downloading, if yes, wireless data card would prompts the information of downloading a wrong software kit, if no, it would send the "download software kit" request information again to the computer, and starts a software kit re-downloading, this course is controlled also by the special wireless data card 1 startup program.

With this method of computer based data card software downloading and updating according to present invention, in virtue of the driver function in end of computer 2, no any more Flash memory is needed in the data card, but store the protocol stack program and application software needed for the data card into the driver data kit of computer 2, in time of the data card is connected with computer 2 and started, computer 2 download the protocol stack program and application software needed for data card to data card RAM memory 12 via high speed data interface, so no any more expensive Flash memory to be used in the data card, a lower cost is thus resulted, and owing to the fact that no software data is stored in the data card, the data card failure resulted from Flash memory damage could be avoided and hence the data card reliability is increased; due to the fact that both the program and software needed for the data card operation is stored in the driver kit 21 of computer 2, in time of updating the data card program and software, only the driver kit 21 of computer 2 needed to be revised, and in course of data card downloading the update program and software from computer 2, it just needs re-update again only even though in fault, the complete operation is convenient and rapid with a wide suitable field, this lays the foundation of the advancing and development for the data communication peripheral equipment technology of portable equipment.

While the present invention has been particularly shown and described with references to preferred embodiments thereof, it will be understood that various changes in form and details may be made therein without departing from the spirit and scope of the invention. It is clearly understood therefore that the same is by way of illustration and example only and is not to be taken by way of limitation.

We claim:

1. A method of computer based data card software downloading and updating, in which said data card includes a CPU and RAM memory connected with it, said method includes the following steps:
   (1) data card connects with computer via data communication interface and acts a power on initial process at same time, the power on initial process includes following steps:
      the data card acts itself a power on hard reset;
      the CPU of data card operates the startup program of data card;
      the data card sets default request times for download to O;
   (2) the data card downloads a software kit from the computer to RAM memory, the computer includes a-driver with the software kit, said data card downloads the software kit from the computer, and an operation includes that
   the data card startup program of data card and the data card driver installed in the computer co-act to download the software kit from the computer to data card, the co-action operation includes following steps:
      (21) the data card connects with computer via data communication interface and initialize said data communication interface;
      (22) the data card driver of computer recognizes if the data card is a valid device, and sets the flag of software—sent in the data card driver to the not—sent default value;
      (23) the data card startup program of data card initializes the RAM memory, and sends the "download software kit" request information periodically to the computer data card driver via said data communication interface and by a default download request interval;
      (24) the computer data card driver operates the corresponding request for downloading software kit;
      (25) the computer data card driver and the data card startup program of data card operate the software kit downloading via the data communication interface;
      (26) after downloading, the data card increases the default request times for downloading by 1 and turns to the following step (3);
   (3) the data card operates the software kit downloaded to the RAM memory.

2. The method of computer based data card software downloading and updating according to claim 1, characterized in that said startup program of data card is stored in the internal ROM memory unit of the data card CPU, and is started from its start address.

3. The method of computer based data card software downloading and updating according to claim 1, characterized in that said request for downloading software kit includes the following steps:
   (241) judge if the data card identified by the computer data card driver and connected with said data communication interface is a valid device of corresponding port, and judge if the flag of "software sent" of data card driver is "not sent";
   (242) if yes, the computer data card driver will continue to receive the software kit download request information of the data card;
   (243) if received, the computer data card driver would sends to the data card a instruction of "stop transmitting request for downloading" and indication of "ready to send software kit";
   (244) after the data card startup program of data card receives the instruction, it would stop transmitting the software kit download request information, and ready to receive the corresponding software kit.

4. The method of computer based data card software downloading and updating according to claim 3, characterized in that said computer data card driver and the data card startup program of data card operate the software kit downloading via the data communication interface, it includes the following steps:

(251) the computer data card driver and the data card startup program of data card co-act to download the corresponding software kit to RAM memory of the data card, and sets the flag of "software sent" to the "transmitting";

(252) after downloading, the computer data card driver would sends to the data card a download complete instruction, and sets the flag of "software sent" to "not sent";

(253) after the startup program of data card in the data card receives the download complete instruction, it continues to execute the following step (26).

5. The method of computer based data card software downloading and updating according to claim 4, characterized in that said data card operates the software kit download to the RAM memory, it includes following steps:

(31) the CPU of data card skips the running address of code to the start address of code stack in RAM memory and operates;

(32) judge if the data card operates correctly the software kit;

(33) if correct, prompts the information that data card downloading the correct software kit;

(34) if not correct, judge if the default request times for download in the data card exceeds the default maximum request times for download;

(35) if yes, prompts the information that data card downloading the wrong software kit;

(36) if no, the data card startup program of data card sends the "download software kit" request information periodically to the computer data card driver via said data communication interface and by the default download request interval again and return back to step(24).

6. The method of computer based data card software downloading and updating according to claim 1, characterized in that said data communication interface includes PCMCIA interface, PCI interface, mini PCI interface, PCI Express interface, mini PCI Express interface, IEEE 1394 interface, USB interface, Parallel Port, Serial Port, Bluetooth Interface or IrDA: Infrared Data Interface.

7. The method of computer based data card software downloading and updating according to claim 1 or 3, characterized in that said data card is wireless data card, the wireless data card includes the wireless communication module, and said wireless communication module connects with said CPU.

8. The method of computer based data card software downloading and updating according to claim 7, characterized in that said wireless communication module includes wireless transceiver and MODEM, said CPU connects said wireless transceiver with MODEM.

9. The method of computer based data card software downloading and updating according to claim 1, characterized in that said software kit includes the data card startup program, L1 driver, communication protocol stack and application program.

* * * * *